(No Model.)
S. A. COONEY.
SPOOL HOLDER.
No. 417,151. Patented Dec. 10, 1889.
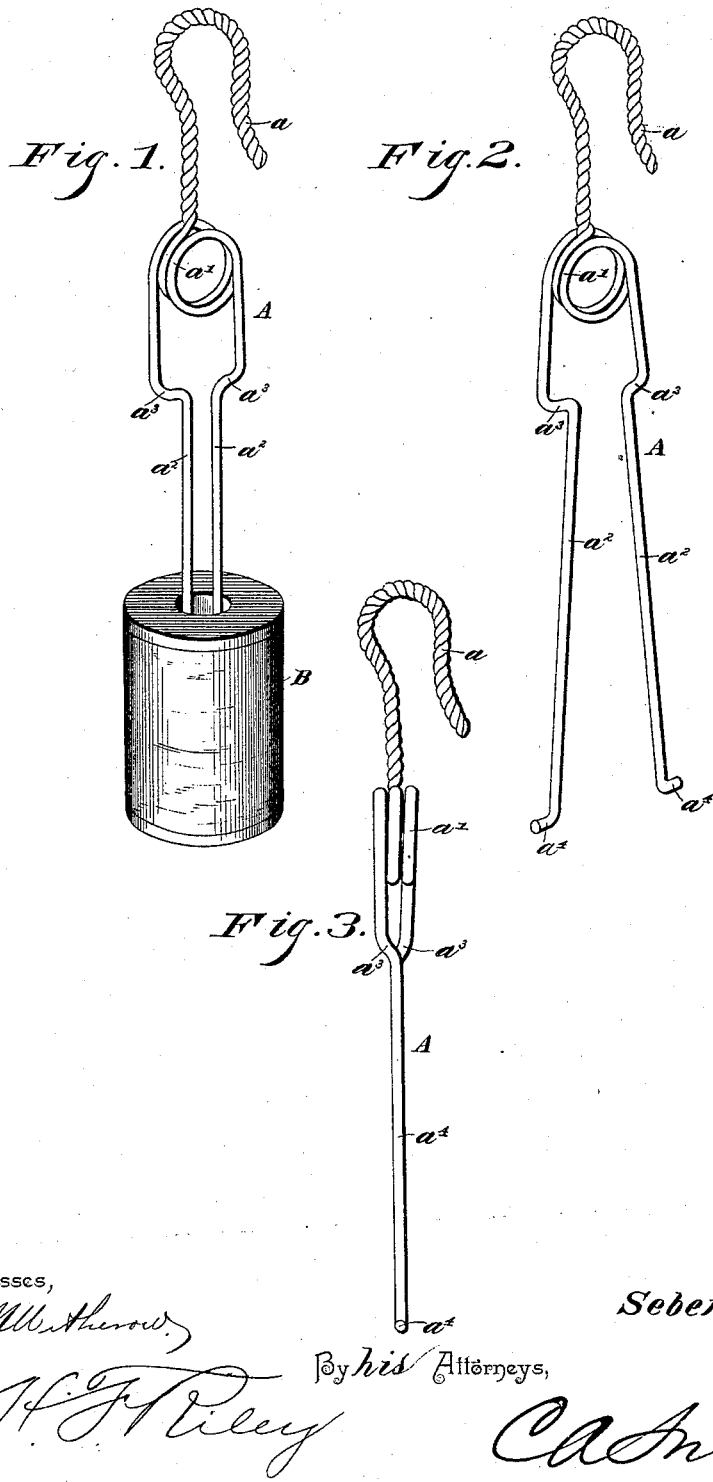
Witnesses,
Inventor,
Sebem A. Cooney,
By his Attorneys,

UNITED STATES PATENT OFFICE.

SEBEM A. COONEY, OF NEW YORK, N. Y.

SPOOL-HOLDER.

SPECIFICATION forming part of Letters Patent No. 417,151, dated December 10, 1889.

Application filed September 24, 1889. Serial No. 324,869. (No model.)

*To all whom it may concern:*

Be it known that I, SEBEM A. COONEY, a citizen of the United States, residing at New York, in the county of New York and State of New York, have invented a new and useful Spool-Holder, of which the following is a specification.

The invention relates to improvements in spool-holders.

The object of the present invention is to provide a spool-holder of simple and inexpensive construction adapted to be readily attached to a button-hole, the side of a basket, or any suitable aperture, and capable of receiving and holding a spool and permitting it to be readily revolved to unwind cotton, thread, or silk, and of being readily inserted or removed from the opening in the spool.

The invention consists in the construction and novel combination and arrangement of parts, hereinafter fully described, illustrated in the accompanying drawings, and pointed out in the claim hereto annexed.

In the drawings, Figure 1 is a perspective view of a spool-holder constructed in accordance with the invention, showing a spool in position ready for use. Fig. 2 is a similar view, the spool being removed. Fig. 3 is a side elevation.

Referring to the accompanying drawings by letter, A designates a spool-holder composed of a single piece of spring-wire, preferably steel, which is double and has its upper end bent into a hook $a$, that is adapted to be engaged in the button-hole of a dress or on the side of a basket or in some suitable convenient aperture, such as an opening in a lace curtain or the like. The two wires or sides forming the hook $a$ are twisted together, and the wires below the shank of the hook form a coil $a'$ and leave the same upon opposite sides, and form a pair of legs which receive the spool B and hold the latter. The coil acts as a spring and tends to spread the legs $a^2$ and hold them into engagement with the sides of the opening in a spool, whereby the spool is securely held in place and is permitted to revolve to unwind the cotton, thread, or the like. The upper portion of the legs is bent inward to bring them nearer together and to form shoulders $a^3$, which limit the upward movement of the spool on the legs $a^2$, and the ends of the latter are bent laterally to form stops $a^4$, to prevent the spool slipping off of the holder.

From the foregoing it will readily be seen that spool-holders made in accordance with this invention are simple and inexpensive in their construction, are adapted to be readily and conveniently attached to a support, may be quickly inserted or removed from the opening of a spool, and will permit the latter to easily revolve in unwinding the thread, cotton, or the like.

Having thus fully described my invention, what I claim as new, and desire to secure by Letters Patent, is—

A spool-holder constructed of a single piece of spring metal and having its upper end bent into a hook $a$, and provided below the hook with a coil and having the approximately-parallel legs $a^2$, leaving the coil upon opposite sides, and provided with bends or shoulders $a^3$, to limit the upward movement of the spool, and stops $a^4$, formed by bending the ends, to prevent the spool slipping off the holder, substantially as described.

In testimony that I claim the foregoing as my own I have hereto affixed my signature in presence of two witnesses.

SEBEM A. COONEY.

Witnesses:
ELLA F. BRAMAN,
JOSEPH C. BRAMAN.

Correction in Letters Patent No. 417,151.

It is hereby certified that the name of the patentee in Letters Patent No. 417,151, granted December 10, 1889, for an improvement in "Spool-Holders," was erroneously written and printed "Sebem A. Cooney," whereas said name should have been written and printed *Sebern A. Cooney;* and that said Letters Patent should be read with this correction therein that the same may conform to the record of the case in the Patent Office.

Signed, countersigned, and sealed this 21st day of January, A. D. 1890.

[SEAL.]
                    CYRUS BUSSEY,
                    *Assistant Secretary of the Interior.*

Countersigned:
  C. E. MITCHELL,
    *Commissioner of Patents.*